June 24, 1930.  M. MacLIVER  1,766,916
GASOLINE THEFTPROOF DEVICE
Filed July 19, 1928

MARY MacLIVER
INVENTOR

PER
Albert J. Fihe
ATTORNEY

Patented June 24, 1930

1,766,916

UNITED STATES PATENT OFFICE

MARY MacLIVER, OF TRINIDAD, COLORADO

GASOLINE THEFTPROOF DEVICE

Application filed July 19, 1928. Serial No. 293,972.

This invention relates to improvements in gasoline theft proof devices and has for one of its principal objects the provision of means for preventing the unauthorized appropriation of gasoline or other such liquid from a tank by the use of a siphon or the like.

One of the important objects of the invention is to provide a gasoline or liquid theft proof device which can be attached to the gasoline tank inlet of the ordinary automobile without the necessity of an expensive alteration or rebuilding of the tank.

Another important object of the invention is the provision of means in combination with a gasoline tank for permitting the tank to be rapidly filled with gasoline and at the same time preventing the removal of the gasoline from the tank except in extremely small quantities at a time.

Other and further important objects of the invention will be apparent from the disclosures in the accompanying drawings and following specification.

The invention, in a preferred form, is illustrated in the drawings and hereinafter more fully described.

Figure 1:
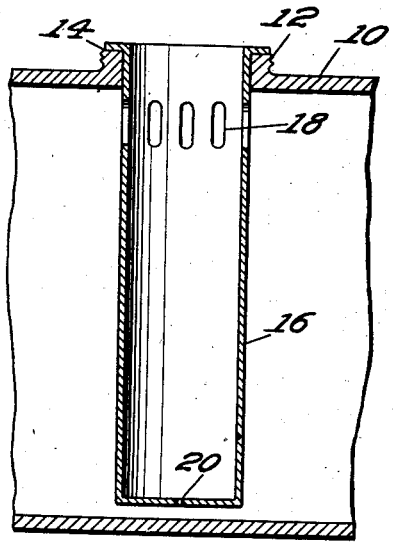
Figure 1 is a sectional side elevation of the theft preventing device, the same being inserted in a gasoline tank.

The reference numeral 10 indicates generally a fragmentary portion of an automobile gasoline tank, having a flanged inlet opening 12 provided therein. Mounted in the inlet opening by appropriate means, preferably by screws 14, welding or the like, is a cylindrical cup 16 preferably constructed of sheet metal or the like. The said cup extends downwardly from the inlet opening and is preferably substantially equal in length to the depth of the tank. Provided in the upper portion of the element 16 are a plurality of overflow ports 18, the sum of the areas of the said ports being large enough to permit the gasoline in the cup 16, on filling the tank, to overflow into the main compartment of the tank as fast as the gasoline is pumped into the member 16. A small opening 20 is provided in the bottom of the cup 16 to permit a head of liquid to be established in the cup equal to the head in the main portion of the tank. Hence a measuring stick may be inserted in the tank for the purpose of determining the amount of gasoline contained therein.

It can be readily seen that if an attempt is made to siphon the gasoline from the tank a small portion may be extracted when the tank is filled, namely the gasoline contained above the level of the lower end of the openings 18. Then the volume of the cup can be extracted but inasmuch as the opening 20 is extremely small the cup 16 would soon be emptied and it is apparent that to remove an appreciable amount of gasoline from the tank would be an interminable task.

Figure 2:
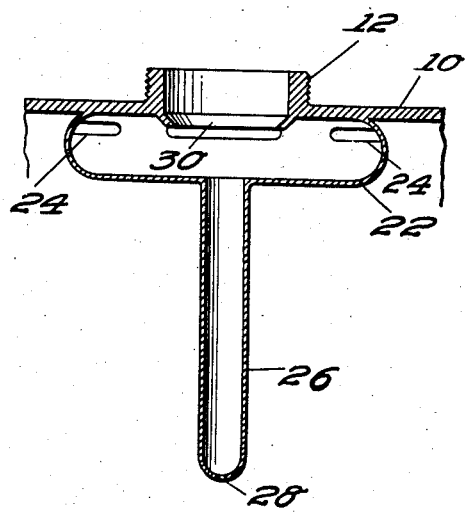
Figure 2 is a sectional side elevation of a modification of the invention, illustrating the high positioning of the overflow openings.

Referring particularly to Figure 2, a modification of the device is shown. An annular receptacle 22 is mounted immediately beneath the opening 12 in the gasoline tank, the said receptacle being provided with a plurality of openings 24 in the upper surface thereof for the overflow of gasoline therefrom on filling the tank. Extending downwardly from the central portion of the receptacle 22 and integrally attached thereto is a tube like member 26, the lower end of which is closed. The member 26 can extend to an optional depth but is preferably of a length substantially equal to the depth of the tank in order that a measuring stick may be therein inserted, an opening 28 being provided in the lower end of the member, similar to the opening 20 in the element 16. A funnel shaped baffle 30 surrounds the inner end of the opening 12 and is adapted to prevent splashing of the gasoline contained in the tank when the same is full.

Figure 3:
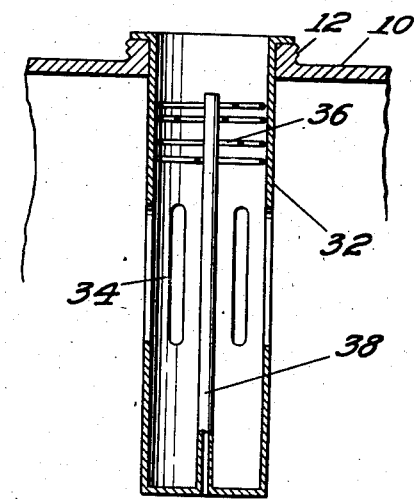
Figure 3 is a sectional side elevation of another modification of the device.

Another modification of the invention is shown in Figure 3. A tubular member 32 extends downwardly from the opening 12 in the tank 10 and is fastened to the tank by appropriate means as described in the principal invention. A plurality of openings 34 is adapted to be filled with steel shavings, steel wool or a like substance 36 which will allow liquid to percolate therethrough but will obstruct the passage of a solid substance such as a siphon hose or the like. It is obvious that by this means no gasoline or liquid of any kind can be removed from the tank by the use of a siphon. A small diameter tube 38 is mounted in the center of the member 32 and is open at its lower extremity into the tank proper. A measuring stick may be inserted therein inasmuch as the height of the liquid in the tube 38 will be the same as that of the liquid in the tank.

Figure 4:
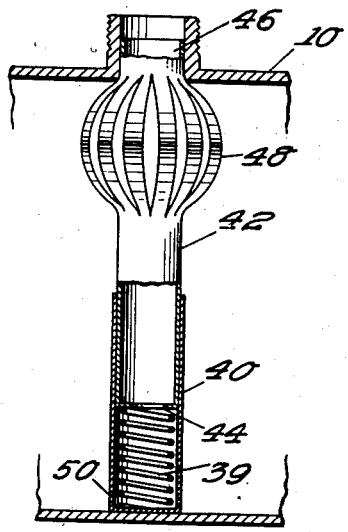
Figure 4 is a partial sectional view of a still further modification of the invention.

A further modification is illustrated in Figure 4, which comprises a tube 40 closed at its lower end. In its open end another tube 42 is adapted to telescopically fit. The lower end of the tube 42 is provided with an annular ring 44 and a helical spring 39 contained within the lower tube 40 acts between the bottom of the tube 40 and the ring 44. The upper end of the tube 42 is adapted to fit into a flanged opening 46 in an appropriate manner preferably by soldering, welding or the like. A plurality of slits 48 are provided in the upper portion of the tube 42 and upon inserting the said tube in the tank the bottom of the tube comes in contact with the bottom of the tank thus compressing the spring 39 and as the upper end of the tube 42 is forced downwardly in the flange 46, the portions of the tube 42 contained within the slits 48 bulge outwardly thereby increasing the area of the openings 48. A small opening 50 is provided near the bottom of the tube 40 and is adapted to permit a level of gasoline to be established in the tubes 40 and 42 equal to the depth of the gasoline in the tank proper. Hence provision is made for the insertion of a measuring stick.

Figure 5:
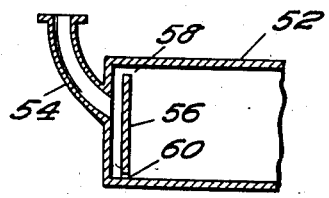
Figure 5 is a side sectional view of a modification of the device as applied to a gasoline tank having an offset inlet.

A still further modification of the invention is shown in Figure 5. A tank 52 which is one of the tanks now in use upon certain makes of automobiles has a curved offset inlet pipe 54. In order to prevent unauthorized siphoning of gasoline from the said tank a baffle plate 56 is provided integrally attached to the bottom and sides of the tank and positioned adjacent the inlet port. The plate 56 does not extend to the top of the tank 52, a small space 58 being provided for the overflow of the incoming gasoline. A small opening is provided in the bottom of the plate 60 in order to establish an equal level of liquid in both portions of the tank divided by the baffle.

It is apparent that herein is provided a means for preventing the siphoning of gasoline from the usual gasoline tank. The invention is readily installed in existing tanks or may be built in the tanks at the time of their making. The construction of the device is very simple and can be manufactured economically and readily marketed.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a theft preventing device for tank contained liquids, a tank having a filling opening provided therein, a receptacle mounted within the tank immediately below the filling opening, the upper outer surface of the said receptacle being provided with a plurality of overflow openings, a downwardly extending tube integral with the receptacle and extending substantially to the bottom of the tank, and a closure for the lower end of the tube, the said closure being provided with a small opening.

2. In a theft preventing device for tank-contained liquids, a tube extending downwardly from the filling opening in the tank to substantially the bottom thereof, a closure for the lower end of the tube, said tube having openings near its top for permitting liquid to enter the tank through the filling opening, and having a relatively small opening at its lower end to allow a slow inflow of liquid for gauging purposes.

In testimony whereof I affix my signature.

MARY MacLIVER.